United States Patent [19]
Schneider

[11] 3,932,104
[45] Jan. 13, 1976

[54] BLOW FORMING APPARATUS FOR PRODUCING DOUBLE-WALLED VESSELS

[76] Inventor: Robert F. Schneider, 2326 Sawtelle Blvd., Los Angeles, Calif. 90064

[22] Filed: Apr. 29, 1974

[21] Appl. No.: 464,811

[52] U.S. Cl. .................. 425/503; 425/DIG. 234
[51] Int. Cl.² ...................................... B29D 23/03
[58] Field of Search .......... 425/DIG. 209, DIG. 234, 425/DIG. 206, 387 B, 503

[56] References Cited
UNITED STATES PATENTS

| | | | |
|---|---|---|---|
| 3,023,461 | 3/1962 | Sherman | 425/DIG. 234 X |
| 3,809,517 | 5/1974 | Schneider | 425/DIG. 209 X |

*Primary Examiner*—Francis S. Husar
*Assistant Examiner*—David S. Safran
*Attorney, Agent, or Firm*—Roger A. Marrs

[57] ABSTRACT

Apparatus is disclosed herein for blow forming a double-walled container or body using either injection or extrusion molding techniques. A mold is provided having a movable sleeve which separates and defines a pair of coaxial wall cavities in parallel relation for receiving a parison during injection molding. A mold is further provided for movably positioning its halves about a pair of coaxial cylindrical parisons so as to close the opposite ends of a predetermined length, this latter procedure being an extrusion molding technique.

1 Claim, 10 Drawing Figures

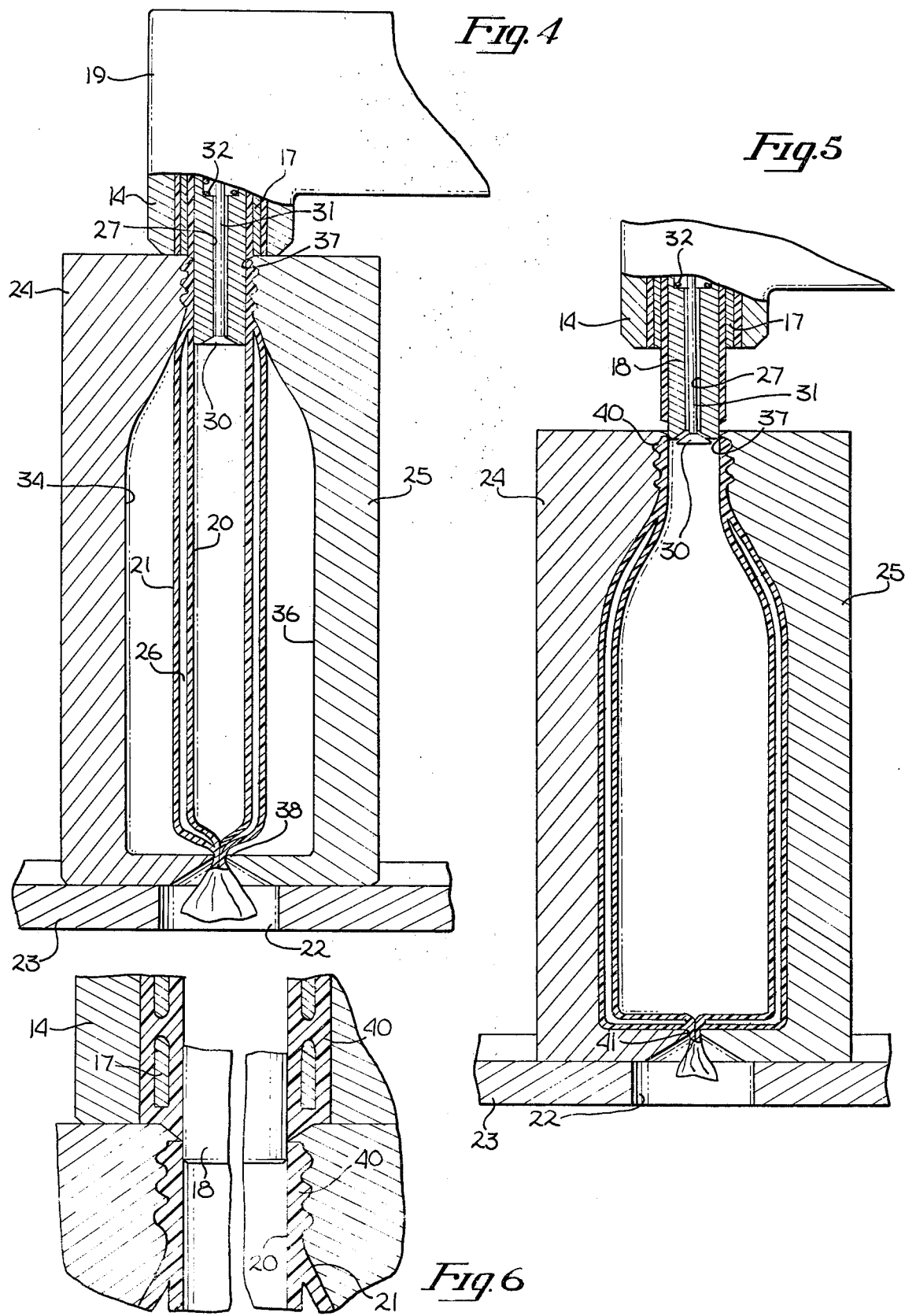

BLOW FORMING APPARATUS FOR PRODUCING DOUBLE-WALLED VESSELS

BACKGROUND OF THE INVENTION

1. Field of the Invention

This invention relates to blow forming mechanisms for mass production of double-walled bodies and, more particularly, to a novel blow forming apparatus in which a parison is extruded or injected into a blowing mold in the form of coaxial parison, defining the double walls of the body.

2. Description of the Prior Art

In the past, it has been conventional practice to employ blow mold techniques and procedures for forming single-walled bodies or containers such as pill bottles, cosmetic containers, liquid storage bottles and the like. In this practice, it is the usual procedure to either inject or extrude a parison into a defined cavity followed by introduction of high pressure air which forces the parison against the shaped walls of the cavity. Upon removal of the mold from around the blown part, the part is then separated from the mold and another part commences formation. Other methods may also be employed for producing single walled vessels or containers. However, it has heretofore been unknown to automatically produce double walled containers on a mass production basis wherein the double walls merge at their opposite ends into an integral sealing and joining formation. It is known that double-walled vessels can be fabricated by using separately produced inner and outer vessels which are inserted within one another and held in place by support pieces such as collars, couplings and the like. Solvent application, ultra sonic or heat-sealing at the junction of the two vessels provides a single air and/or vacuum trapped double walled vessel. An example of this prior art double-walled vessel may be a conventional vacuum bottle or thermos bottle.

Another disadvantage of conventional single-walled vessel production apparatus resides in the necessity of moving the partially formed part from one place to another or from one station to another so that different phases of the formation can be completed. In other words, means are not provided whereby the parison may be completely formed and shaped at one station in the machine operation. The partially shaped parison must be moved from one portion of the mold to another portion in order to successively shape the whole parison into a desired configuration. This problem again makes the formation of double-walled vessels impossible if not extremely difficult when employing conventional molding machines.

Therefore, a need has long existed to provide a suitable apparatus for producing double-walled vessels by either injection-blow-molding techniques or by employing extrusion-blow molding practices.

SUMMARY OF THE INVENTION

Accordingly, the problems and difficulties encountered with the prior art are obviated by the present invention which provides an apparatus for producing double-walled vessels on a mass production basis. The apparatus includes a means for supplying heated plastic-like material through an extrusion die under high pressure into coaxially defined cavities separated by an elongated cylindrical movable sleeve so that the parison downwardly depends through the cavities in parallel coaxial relationship. This relationship defines coaxially disposed cylindrical extruded parisons that are disposed between opposing halves of a shaped mold. High pressure air discharge means are provided communicating with the bore of the inner parison cylinder whereby the introduction of high pressure air forces the parisons into conformity with the shaped walls of the mold. Mating of the mold halves severs the parisons from the extrusion apparatus and closes the opposite ends of the cylinders constituting the double walled vessel. Means are provided for opening the mold and to release or remove the formed vessel from the apparatus.

In another form, an injection molding apparatus is provided for forming double-walled vessels which includes a mold having a pair of coaxial cavities into which a heated plastic material is formed into an inner and outer parison by forcing the material through the dispensing nozzle under suitable pressure. Once the cavities have been loaded with the double parison, a sleeve separating the parison walls is removed and air is introduced to a selected one of the spaces separating the walls so as to below the outer wall outwardly into conformity with the shaped cavity of the mold. Means are provided to seal the bottom of inner and outer walls with the residual heat of the vessel material so as to trap air between the walls. Means are employed for opening the mold to expose the formed part and for removing the part from the apparatus so that the forming cycle of the next vessel may be initiated.

Therefore, it is among the primary objects of the present invention to provide a novel blow forming apparatus that is suited for production of double-walled bodies that may be produced by means of extrusion or injection-molding techniques.

Another object of the present invention is to provide a novel blow forming apparatus in which the coaxial tubular parison-formed inner and outer walls of a double-walled vessel are produced simultaneously and whereby the opposite ends of the parison tubes may be joined in an integral relationship constituting the formed double-walled vessel.

Another object of the present invention is to provide a novel blow forming apparatus wherein a double-walled cylindrical vessel may be fabricated employing injection-molding techniques wherein the double walls of the vessel are simultaneously formed and wherein movement of the mold halves together effects an integral joint at the opposite ends of the coaxially disposed parisons forming the double walls to seal an internal cavity defined between the walls.

Yet another object of the present invention is to provide a novel blow forming apparatus employing extrusion-molding techniques wherein a pair of coaxial parisons downwardly depends from the extrusion die so as to form a pair of coaxial walls and wherein the halves of the shaped mold come together to integrally join the opposite ends of a selected length of the coaxial parison to form the top and bottom of the vessel.

Still a further object of the present invention is to provide a novel blow extrusion or injection forming apparatus in which a double-walled vessel is formed in place without movement from station to station in order to transfer shape of the parison (preform) to that of the mold (cavity).

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 4 is a view similar to the view shown in FIG. 1 showing the mold halves moved together to close the opposite ends of the parison tubes;

FIG. 5 is a view similar to the view of FIGS. 1 and 4 illustrating expansion of the double-walled parison tubes into the shape of the mold cavities upon introduction of air into the central bore of the parisons;

FIG. 6 is an enlarged view of the extrusion mold immediately at the upper end of the double-walled vessel as it is formed and illustrating the closure of the mold halves to form one end of the vessel;

DESCRIPTION OF THE PREFERRED EMBODIMENT

Figures 1, 2, 3:
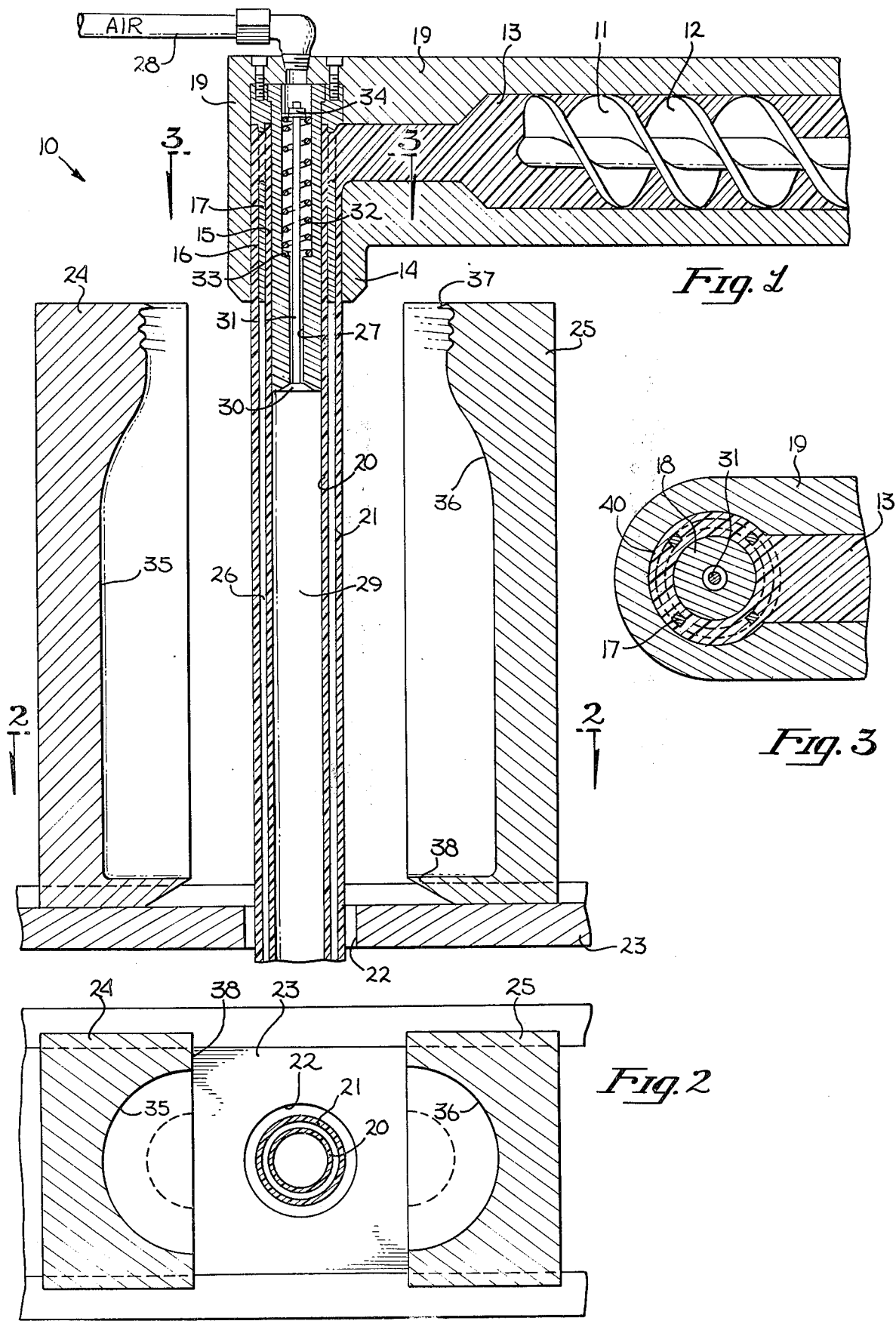
FIG. 1 is a cross-sectional view of an extrusion-blow molding machine with apparatus for producing a double-walled body or container and illustrating a pair of coaxially disposed cylindrical parisons downwardly depending from the extrusion die preparatory to shaping.
FIG. 2 is a transverse cross-sectional view of the blow molding apparatus shown in FIG. 1 as taken in the direction of arrows 2—2 and illustrating the disposition of the coaxial parisons between the shaped halves of the mold.
FIG. 3 is an enlarged fragmentary view, in section, of the air discharge means incorporated into the blow mold machine of FIG. 1 as taken in the direction of arrows 3—3 thereof.

Referring to FIG. 1, the novel blow forming machine of the present invention is illustrated in the general direction of arrow 10 and takes the form of a blow extrusion machine wherein an automatic feeder is provided having a worm screw 11 movably supported by any suitable means within a chamber formed in a body 12 through which a quantity of heated plastic-like material 13 is passed under pressure. In the present illustration, continuous extrusion is performed in the screw-type mechanical machine and current practice permits extrusion of thermoplastic materials such as cellulose derivatives and polystyrene and vinylidene chloride having the most commercial significance. However, it is also possible to process thermosetting materials as well.

The screw-type feeder is suitable connected to a hopper (not shown) via a heating cylinder and externally heated by bands (not shown). The granular molding compound is squeezed from the heated cylinder around body 19 through an extrusion die, as indicated by numeral 14, by means of the revolving screw or other suitable pressure device. For intermitten extrusion, passage of the material may be in a hydraulic-ram type cylinder. The die 14 is preferably heated to obtain full plasticity of the plastic-like material passing through it.

It is to be particularly noted that the extrusion die 14 comprises a pair of coaxial passageways which are occupied by the plastic-like material which is indicated by numerals 15 and 16 so as to represent the inner and outer walls of the double-walled vessel to be produced. The parisons constituting coaxial portions 15 and 16 are separated by means of a cylindrical sleeve 17 which forms a part of the extrusion die and is secured in fixed spaced relationship between a central core 18 and an outer housing or body indicated by numeral 19. Body 19 is further formed with an annular chamber interconnecting the discharge end of the outlet part of the revolving screw with the coaxial passageways occupied by parisons 15 and 16. Therefore, it can be seen that the parison is forced by the revolving screw through body 12 into the annular chamber formed in body 19 and then into the elongated coaxial passageways separated by sleeve 17. The discharge or nozzle end of the extrusion die 14 permits the parisons to downwardly depend in a pair of coaxial tubes identified by numerals 20 and 21 which constitute the inner and outer walls of the double-walled vessel to be formed. The extruded parisons 20 and 21 extend downwardly from the extrusion die 14 through an aperture 22 formed in base 23 of the machine. The base 23 supports a shaped mold comprising mold half-sections 24 and 25 which are formed with opposing cavities defining the desired shape of the end product. In FIG. 1, the mold is open.

It is to be particularly noted that once the parisons 20 and 21 have been forced through the extrusion die 14, they remain coaxial to define a circular passageway or cavity between their opposing wall surfaces and this passageway is identified by numeral 26. The width of the passageway 26 is substantially equal to the thickness of the sleeve 17 forming a part of the extrusion die.

It is also to be noted that the core 18 includes an elongated passage 27 which terminates at one end with a pipe 28 connected to a suitable source of high pressure air. The opposite end of passageway 27 is closed by means of a valve closure 30 carried by a stem 31 movably disposed within the passageway 27. The closure 30 is normally biased in its position to close passageway 27 by means of a compression spring 32 operating at one end against an internal shoulder 33 and at its other end operating against a nut 34 carried on the end of stem 31. Upon the application of high pressure air from pipe 28 into passageway 27, the closure 30 will open to expel the high pressure air into the central opening 29 of the parison 20.

In the extrusion process, no restraint is imposed on the extruded material after it has passed through the orifice of the extrusion die 14. The parison stabilizes without being restrained in a form as in injection molding and owing to the elevated temperatures involved, the parison can be easily deformed. The shape of the discharge nozzle or orifice and the functioning of any take-off device and/or gravity (elongation) are the only means available to assist in maintaining the proper shape and size of the product without causing distortion, surface marring or stains in the material.

In FIG. 2, it can be seen that the parison tubes 20 and 21 occupy an area midway between the opposing shaped surfaces 35 and 36 of the mold half-sections 24 and 25, respectively. The opposite ends of the mold half-sections 24 and 25 include off means 37 and 38 associated with the top and bottom of the end product or vessel and is more clearly seen in FIG. 1. The mold halves 24 and 25 are movably placed on base 23 so that they may be readily moved together to form a complete mold or shaped cavity about the downwardly depending parison tubes 20 and 21. The mold half-sections may be moved by any suitable means such as a lead screw, hydraulic plunger or the like.

In FIG. 3, it can be seen that the sleeve 17 is in communication with a plurality of apertures, such as aperture 40 in the sleeve 17 which permits the parison material under high pressure to pass from the revolving screw 11 to the extrusion die 14 through apertures to inner space 15 providing double extruded tubes.

The compression spring 32 maintains the valve closure 30 in its closed position against any plastic inflow into pasageway 27. The proper air pressure supplied via pipe 28 at the proper time will operate against the compression of the spring to open the valve closure 30. Preferably, the valve stem is formed with at least four flutes so that a sufficient quantity of air may be processed through the passageway 27 regardless of its relatively small diameter.

As shown in FIG. 4, the mold half-section 24 and 25 have been moved together on base 23 so that the opposing shaped mold surfaces 35 and 36 combine to surround and confine the parisons 20 and 21. In this process, it is noted that the upper cutting means 37 and the lower cutting means 38 engage with the parison and pinch or separate the length of parison confined between the cutting means from the parison supplied by the extrusion die 14 or extending through the aperture 22 in the base 23. This pinching movement serves to close off the lower part of the pair of parison tubes so as to form the bottom of the vessel to be produced. The upper end of the parison tubes 20 and 21 fill certain areas of the mold shape which, in the present instance, represent the neck of the vessel to be produced and its attendent screw threads for accommodating a cap or screw-type closure. It is also to be noted in FIG. 4 that the tubular parisons 20 and 21 have now been separated from the die orifice 14 and that the sleeve 17 no longer defines or occupies the internal cavity 26 separating the opposing walls of the coaxial parisons 20 and 21. Pinch off on core 18 seals and prevents air from blowing up into spaces 15 and 16 and acts as an anvil to compression form threads by members 24 and 25.

Referring now in sequence to FIG. 5, it can be seen that the extrusion die 14 along with the sleeve 17 may be moved upwardly about the central core 18. Also, it can be seen that not only do the upper closure means 37 sever the downwardly depending parisons from the material being extruded from the die orifice, but forms a weld of the outer wall to the inner wall under residual heat and compression. This annular weld is identified by numeral 40 and it is to be understood that another heat-compression weld is formed at the location of the lower pinch by severing means 38 as indicated by numeral 41.

FIG. 5 further illustrates the introduction of high pressure air through passageway 27 and the fluted stem 31 so that the closure 30 opens to intercommunicate passageway 27 with the interior of the inner parison tube 20. By pressurizing the central bore of parison 20, not only will the inner and outer walls of the tubes be forcibly urged outwardly into conformity with the shape of the mold wall surfaces 35 and 36 but the bottom will be formed as well as the top or neck of the vessel. The cavity 26 traps or entrains air therein and therefore, by forcing inner wall 20 outwardly, outer wall 21 is similarly forced out. Welds 40 and 41 suitably seal cavity 26 so that a "thermos" bottle effect is produced.

After the high pressure air has been introduced into the center of the double-walled vessel so as to expand the parisons outwardly into conformity with the shape of the mold, the air pressure is reduced and the mold opening by spreading mold half-sections 24 and 25 apart so that the end product or vessel is released. The product may then be removed from between the mold half-sections by an air jet which blows the product away or by a knockoff arm or any suitable device.

As illustrated in FIG. 6, the inner and outer walls are joined in a heat-compression weld indicated by numeral 40. The external surface of the outer wall conforms to the indentation of the mold surface so as to provide threads for receiving a threadable cap or closure device for the end product bottle or vessel. The mouth of the vessel is maintained constant by means of the extrusion die 14 which is removed after air has been injected into the central bore of the inner wall 20.

The resultant bottle may be used for insulative purposes since air is captured within passageway or cavity 26 or the double-walled vessel may be used in instances where double-walled strength is required, such as for containing pressurized fluids as aerosols, or other compressed air or spray dispensers. Furthermore, air shock insulation is provided by the double-walled construction so that volatile liquids, such as acids, explosives or flammable materials may be adequately stored with stability and safety.

Figure 7:
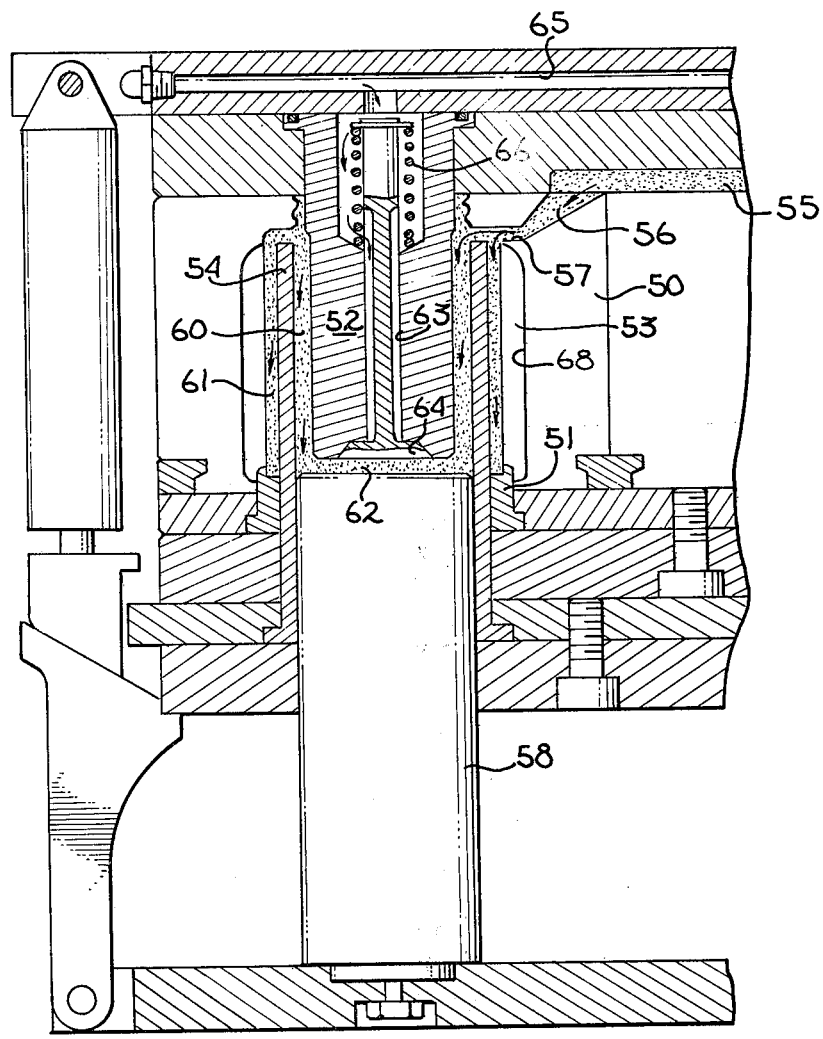
FIG. 7 is another embodiment of the present invention illustrated in cross-section showing a blow forming apparatus employing injection-molding techniques for producing a double-walled body.

Referring now to FIG. 7, another embodiment of the present invention is illustrated which involves an injection molding procedure. The mold is generally indicated by numeral 50 and is supported on a base plate 51 so that a central cavity of the mold shell 50 is substantially occupied by a core 52 which is inserted through the top opening of the mold shell. The central cavity of the mold is indicated by numeral 53 and is illustrated as being occupied in a central portion by the core 52, a cylindrical sleeve 54, and parison material 55 which is introduced through a sprue 56 to the mold cavity. The discharge orifice leading into the mold cavity is indicated by numeral 57 and the material flow is indicated in the general direction of the arrows as shown. It can be seen that the parison occupies a pair of coaxial passageways separated by the sleeve 54 and that the bottom of central core 52 is in fixed spaced relationship with respect to a guide cylinder 58.

Also, FIG. 7 discloses that the central core 52 includes an elongated passageway 63 in which a closure valve 64 is arranged by its stem to effect closure at the end of the central core 52. In this instance, the passageway 63 is employed to conduct high pressure air from an air line 65 into the cavity of the mold for blowing the parison. In a similar fashion to that illustrated with respect to the embodiment in FIG. 1, a spring 66 is employed for normally biasing the valve closure in its closed position and the stem of the valve is fluted to permit passage of air when the valve seat or closure 64 is opened.

Figure 8:
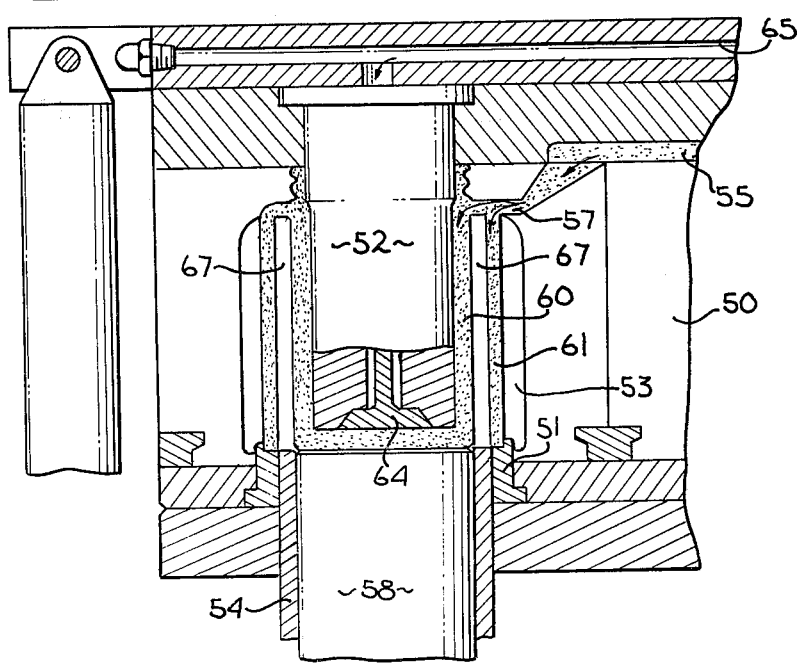
FIG. 8 is a view similar to the transverse cross-sectional view of FIG. 7 showing the formation of an internal closed cavity defining the coaxial inner and outer walls of the double-walled vessel.

Referring now to FIG. 8, the parison material is initially injected into the cavity of the mold so that it is completely occupies and is confined in the cavity. The core 52 serves as a central portion of the mold while the sleeve 54 is illustrated as having been removed by lowering so as to create a circular void or passageway 67 defined by the opposing wall surfaces of parisons 60 and 61.

Figure 9:
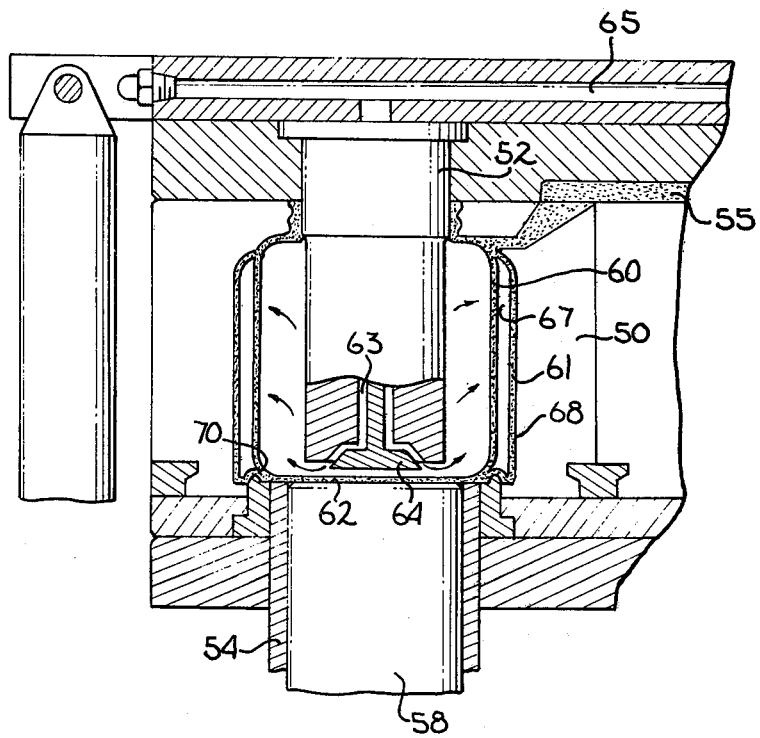
FIG. 9 is a view of the double-walled injection-blow molding apparatus shown in FIGS. 7 and 8 illustrating introduction of air into the inner closed parison so as to expand and seal the double-walled preform into the shape of the mold.

Referring to FIG. 9, the next step is illustrated in which air is introduced from duct 65 and through passageway 63 against the parison 62. As the high pressure air impinges against the parison 62, the parison is forcibly urged outwardly from the exterior side surfaces of the central core 52. As air continues to be supplied through the valve closure 64, the parison 60 separates from central core 52 and expands outwardly. Air is trapped within the passageway 67 so that parison 61 moves outwardly into conformity with the shaped surface of the mold shell. The surface of the mold is indicated by numeral 68 and the outer parison 61 will conform to the shape thereof.

It is also to be noted that as the inner and outer parisons 60 and 61 outwardly expand in a radial direction, the lower portion of the parisons will merge together in a heat-compressive weld and indicated by numeral 70. This weld completely seals off the passageway 67 and the parisons 60 and 61 provide the inner and outer walls of the resultant end product or vessel.

Figure 10:
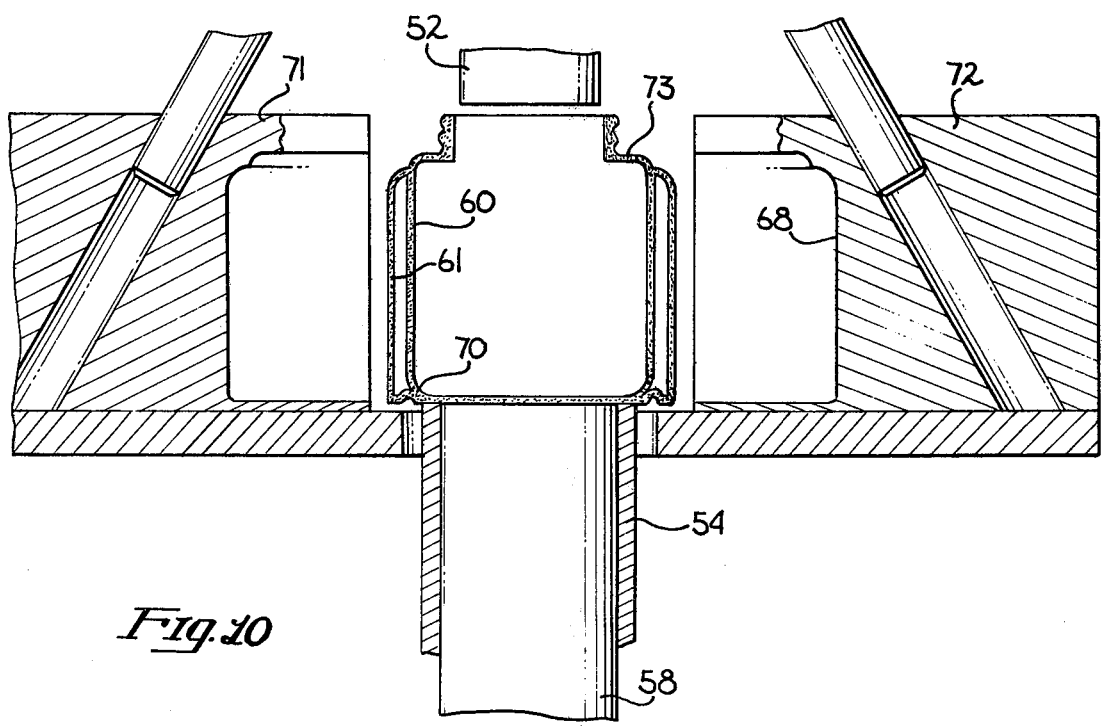
FIG. 10 is a view of the double-walled injection blow molding apparatus illustrating separation of the mold halves to expose the completed double-walled vessel after formation.

In FIG. 10, the end product has been formed and the mold shell 50 is actuated so that its respective half-sections 71 and 72 move in opposite directions to release and expose the double-walled vessel indicated by numeral 73. The central core 52 is moved out of the mouth of the vessel and the support base 58 is moved out of the way in a downward direction. At this time, it is to be noted that the finished product or vessel 73 rests on the extreme top or terminating end of sleeve 54 which was previously removed from the mold cavity to provide passageway 67. The end product or vessel 73 may now be removed by an air jet stream or knockout bar or any other suitable device so that another vessel may be injection molded in the mold 50.

Therefore, it can be seen that a double-walled vessel having captured or entrained air within a circular cavity or passageway is readily provided employing either extrusion or injection molding techniques. The present invention is not concerned with preparation of the granulated material or the specific means by which the material is introduced into the mold cavity. The invention relates to the apparatus and method for producing double-walled vessels which envisions the concept of extruding or injecting material for the double walls in a coaxial relationship followed by terminating the ends of the tubular parisons so as to seal off the passageway between the opposing wall surfaces of the inner and outer walls and then removing the finished product from the forming or mold station.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An apparatus for blow forming of hollow bodies so as to produce a double-walled vessel, the combination comprising:
   a mold including a pair of mated halves having an open cavity defined by the shape of opposing internal wall surfaces;
   sleeve means disposed over said open cavity for separating supplied parison within said mold cavity into coaxial inner and outer tubes;
   means forming a portion of said mold at its extreme opposite ends for joining the opposite ends of said coaxial inner and outer tubes to seal said circular space between said inner and outer tubes so as to constitute the double walls of said vessel;
   an extrusion die for extruding the parison into said cavity;
   said sleeve comprising a part of said die whereby parison is divided into a pair of downwardly depending coaxial tubes into said mold cavity;
   said joining means comprises cut-off portions at opposite ends of said mold cavity for severing said parisons and engaging the terminating ends of said tubes together in an integral joint;
   means for trapping air between the opposing surfaces of said inner and outer tubes comprising;
   air means for introducing pressurized air into the center of said coaxial tubular parisons urging the parisons into the form of said cavity.

* * * * *